(12) United States Patent
Wolfe et al.

(10) Patent No.: US 7,342,488 B2
(45) Date of Patent: Mar. 11, 2008

(54) SYSTEM AND METHOD FOR PROVIDING HOME AWARENESS

(75) Inventors: Edward H. Wolfe, Plano, TX (US); Eric W. Chisholm, Toronto (CA)

(73) Assignee: InnVision Networks, LLC, Plano, TX (US)

( * ) Notice: Subject to any disclaimer, the term of this patent is extended or adjusted under 35 U.S.C. 154(b) by 87 days.

(21) Appl. No.: 10/965,463

(22) Filed: Oct. 13, 2004

(65) Prior Publication Data

US 2006/0087428 A1 Apr. 27, 2006

(51) Int. Cl.
*G08B 23/00* (2006.01)
(52) U.S. Cl. .................. 340/500; 340/539.1; 340/531; 340/815.14; 725/9; 725/32; 725/152; 725/81
(58) Field of Classification Search ............. 340/539.1, 340/539.14, 539.16, 539.17, 539.22, 539.26, 340/525, 531, 815.4, 815.14; 725/9, 33, 725/32, 81, 152, 153
See application file for complete search history.

(56) References Cited

U.S. PATENT DOCUMENTS

| | | | |
|---|---|---|---|
| 4,926,256 A | 5/1990 | Nanba | |
| 5,543,852 A * | 8/1996 | Yuen et al. .................. | 348/478 |
| 5,822,012 A | 10/1998 | Jeon et al. | |
| 5,867,205 A | 2/1999 | Harrison | |
| 5,878,222 A | 3/1999 | Harrison | |
| 6,424,252 B1 * | 7/2002 | Adler ....................... | 340/311.2 |
| 6,587,739 B1 * | 7/2003 | Abrams et al. ................ | 700/83 |
| 6,601,103 B1 | 7/2003 | Goldschmidt et al. | |
| 6,732,369 B1 | 5/2004 | Schein et al. | |
| 6,816,069 B2 | 11/2004 | Quigley | |
| 2002/0083470 A1 | 6/2002 | Lu | |
| 2002/0101537 A1 | 8/2002 | Basson et al. | |
| 2003/0005462 A1 * | 1/2003 | Broadus et al. ............. | 725/110 |
| 2003/0065803 A1 | 4/2003 | Heuvelman | |
| 2003/0097659 A1 * | 5/2003 | Goldman ..................... | 725/89 |
| 2003/0121036 A1 | 6/2003 | Lock et al. | |
| 2003/0121059 A1 | 6/2003 | Ramaswamy | |
| 2003/0131356 A1 * | 7/2003 | Proehl et al. ................. | 725/58 |
| 2003/0221198 A1 | 11/2003 | Sloo | |
| 2004/0113770 A1 * | 6/2004 | Falk et al. .................. | 340/531 |
| 2004/0117843 A1 * | 6/2004 | Karaoguz et al. .......... | 725/108 |
| 2004/0148632 A1 * | 7/2004 | Park et al. .................... | 725/81 |
| 2005/0039219 A1 * | 2/2005 | Cooper et al. ............. | 725/134 |
| 2005/0071879 A1 * | 3/2005 | Haldavnekar et al. ........ | 725/81 |
| 2005/0125083 A1 * | 6/2005 | Kiko ........................... | 700/19 |
| 2006/0012466 A1 * | 1/2006 | Wagner et al. ......... | 340/286.11 |
| 2006/0168635 A1 * | 7/2006 | Terashima et al. .......... | 725/110 |

FOREIGN PATENT DOCUMENTS

WO PCT/US2005/036649 4/2006

\* cited by examiner

*Primary Examiner*—Benjamin C. Lee
*Assistant Examiner*—Edny Labbees
(74) *Attorney, Agent, or Firm*—Scott T. Griggs; Griggs Bergen LLP

(57) ABSTRACT

A system and method for providing home awareness are disclosed. In one embodiment, a sensor is associated with a household amenity. In response to the occurrence of an event, a wireless signal is transmitted to a monitoring unit which, in turn, superimposes a text message indicative of the event onto a video signal. A display unit, such as a television, is connected to the monitoring unit and displays the video signal including the superimposed text message.

22 Claims, 4 Drawing Sheets

US 7,342,488 B2

SYSTEM AND METHOD FOR PROVIDING HOME AWARENESS

TECHNICAL FIELD OF THE INVENTION

This invention relates, in general, to consumer electronic devices and, in particular, to a system and method for monitoring home status and providing home awareness to television viewers through the use of a monitoring unit in a connected home.

BACKGROUND OF THE INVENTION

Television provides news and entertainment to viewers through an ever increasing offering of content made possible by local access channels, cable systems, pay-per-view channels, satellite systems, game consoles, and DVD players, for example. As the news and entertainment options available via television have increased, the amount of time viewers typically spend watching television has increased as well. Consequently, television has become the audio and visual medium of choice for providing information. Accordingly, a need has arisen for systems and methods that utilize television to provide content other than news and entertainment.

SUMMARY OF THE INVENTION

A system and method for providing home awareness are disclosed. In one embodiment, a sensor is associated with a household amenity. In response to the occurrence of an event, a wireless signal is transmitted to a monitoring unit which, in turn, superimposes a text message indicative of the event onto a video signal. A display unit, such as a television, is connected to the monitoring unit and displays the video signal including the superimposed text message.

In another embodiment, a system and method for providing environmental awareness are disclosed. A plurality of sensors may be dispersed in the environment to transmit a wireless signal in response to an event occurrence. A monitoring unit, responsive to the wireless signal, superimposes a message onto a video signal which is displayed by a display unit.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
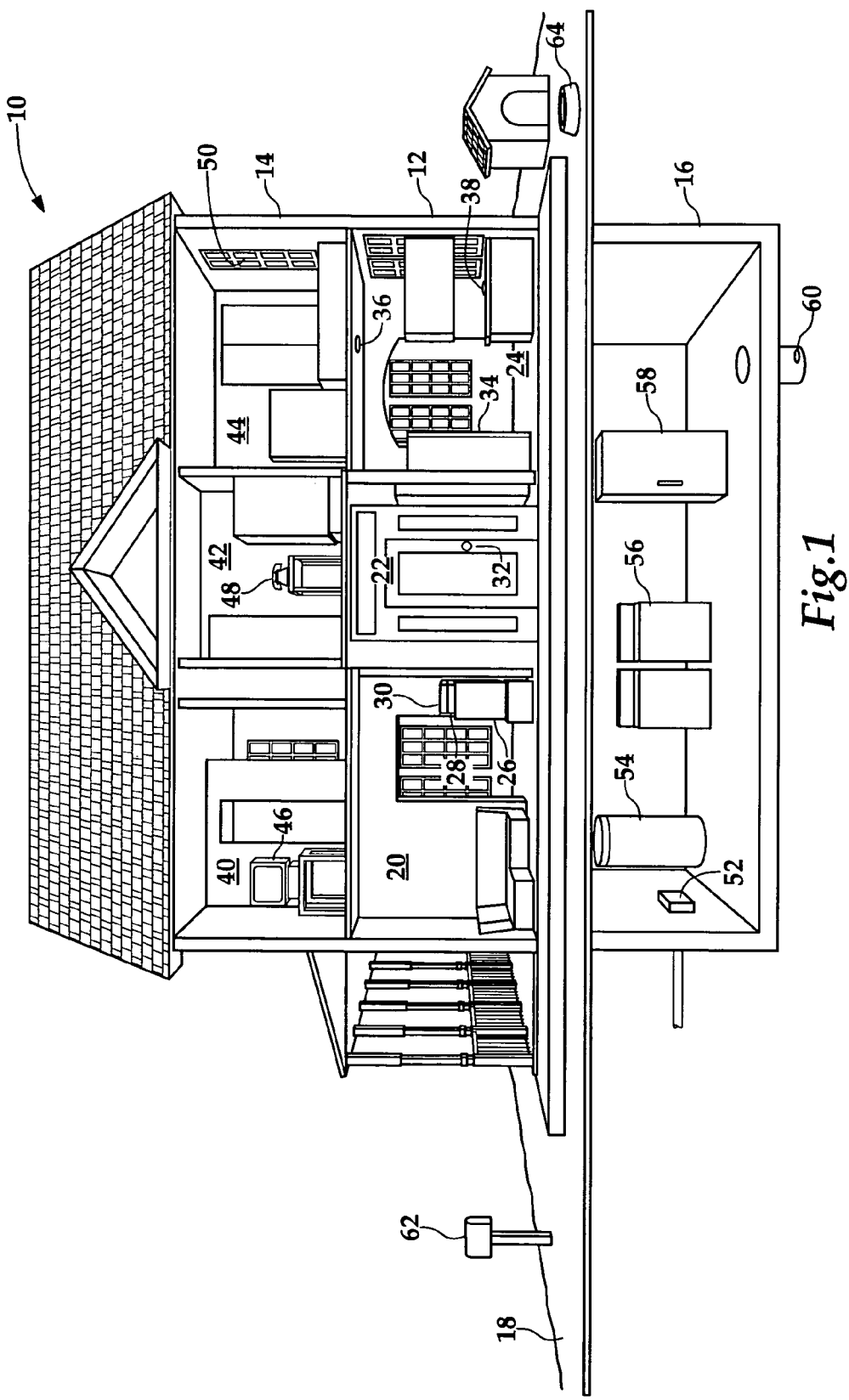
FIG. 1 is a schematic diagram of a home wherein the system for providing home awareness is being advantageously utilized.

Referring initially to FIG. 1, a home 10 utilizing one embodiment of a system for home awareness is depicted. The home 10 includes a first floor 12, a second floor 14, a basement 16, and a yard 18. A living room 20, an entry way 22, and a kitchen 24 are located on the first floor 12. In the living room 20, a television 26 receives programming through a set top box 28 which may provide cable programming or satellite programming, for example. A monitoring unit 30 is connected to the television 26 and the set top box 28 such that the video signal feed is relayed from the set top box 28 to the monitoring unit 30 to the television 26.

Sensors are associated with various household amenities throughout the first floor 12, second floor 14, basement 16, and yard 18 of the home 10. Each sensor is operable to transmit a wireless signal in response to an event occurrence associated with the respective household amenity. As will be discussed further below, the event may be the ringing of a doorbell, the detection of water, or the detection of a low battery, for example. The monitoring unit 30 receives the wireless signals from the sensors and superimposes text messages indicative of the events onto the video signal that is received from the set top box 28 and transmitted to the television 26. The text messages provide a television viewer with the ability to monitor the status of home 10 and determine home awareness while engaged in watching television programming. As used herein the term text message encompasses messages comprising words, icons, symbols, and combinations thereof.

By way of example, the entry way 22 includes a front door 32 having a doorbell associated therewith. A sensor connected to the doorbell senses when the doorbell is rung and sends a corresponding wireless signal to the monitoring unit 30, which superimposes the text message "DOORBELL" onto the video signal feed being provided to the television 26. The television viewer or viewers read the text message and are aware of the ringing doorbell while watching the television in the living room 20. This is particularly useful in instances where the television viewers have the television volume excessively high or the doorbell amplifier and speaker is sufficiently removed from the living room 20.

By way of further example, the kitchen 24 includes a number of household amenities such as a refrigerator 34 that is equipped with a sensor that detects the status of the refrigerator door, i.e., open or closed. When the refrigerator door is open for more than 30 seconds, for example, a wireless signal is transmitted from the sensor to the monitoring unit 30. The monitoring unit 30 superimposes the text message "REFRIGERATOR DOOR AJAR" onto the video signal feed being provided to the television 26. A smoke detector 36 is another household amenity that is located in the kitchen 24. A sensor associated with the smoke detector 36 monitors the battery and sends an appropriate wireless signal to the monitoring unit 30 when the battery becomes low. Additionally, the sensor associated with the smoke detector 36 transmits a wireless signal when the smoke detector detects smoke. A signal relay unit 38 is located on a counter top in the kitchen 38 to relay weak wireless signals from household amenities to the monitoring unit 30. The signal relay unit 38 may relay weak wireless signals from the basement 16 or the lawn 18 to the monitoring unit 30.

The second floor 14 of the house 10 includes a study 40, a hallway 42, and a bedroom 44. As illustrated, a computer 46 is located in the study 40. A sensor associated with the computer 46 sends a wireless signal to the monitoring unit 30 in response to receiving an email. A telephone 48 is sitting on a stand in hallway 42. A sensor associated with the telephone 48 monitors for an incoming call and broadcasts a wireless signal in response thereto. The room 44 includes an entry point or window 50 having a sensor associated with a security system. The sensor broadcasts a wireless signal in response to the detection of broken glass or the opening of the window 50, for example.

Similarly, the basement 16 includes a number of household amenities having sensors associated therewith that send wireless signals to the monitoring unit 30. A water shut-off box 52, a hot-water heater 54, a washer and dryer 56, a meat freezer 58, and a sump pump 60 each have a sensor that detects the occurrence of an event. The sensor associated with the water shut-off box 52 may detect the condition of the water valve; namely open or closed. The sensor associated with the washer and dryer 56 alerts the television viewer when a load has finished washing or drying. The sensor associated with the meat freezer 58 detects an ajar door and the sensor associated with the sump pump 60 broadcasts a wireless signal upon detecting the presence of water.

The amenities found in lawn 18 may also include sensors. A mailbox 62 may include a sensor that detects the opening and closing of the mailbox door in order to provide an indication that mail has arrived. Additionally, a pet bowl 64 may include a sensor that detects the emptying of the food in the bowl. The household amenities described herein encompass simple mailboxes to complex security systems. Accordingly, it should be appreciated that the home 10 utilizing the system for providing home awareness presented herein permits members of the household to monitor any technology that the household is inclined to implement. In particular, the sensors may monitor household amenities relating to the environment, family comfort, utilities, appliances, and security. By way of further example, the sensors may monitor the turning ON or OFF of particular lights, power usage, the opening and closing of a garage door, the turning ON and OFF of an iron, the freezing of a pipe, the presence water leaks, the presence of gas or carbon monoxide (CO), temperature and humidity, the efficiency of an HVAC system, and the presence of smoke or fire. Additionally, the system for home awareness may provide schedule reminders, medical alerts, and the like. It should be understood that although only one television is illustrated in FIG. 1, the systems and methods presented herein may be utilized in a multiple television or multiple display environments wherein a monitoring unit associated with each display receives all or a portion of the wireless signals from the sensors and provides the appropriate text messages. In one implementation, the computer 46 located in the study 40 has a monitoring unit connected therewith so that a user of the computer 46 is provided with home awareness. Further, although a house is illustrated in FIG. 1, the teachings presented herein are applicable to apartments as well as non residential, commercial, and transient environments as will be described in detail herein below.

Figure 2:
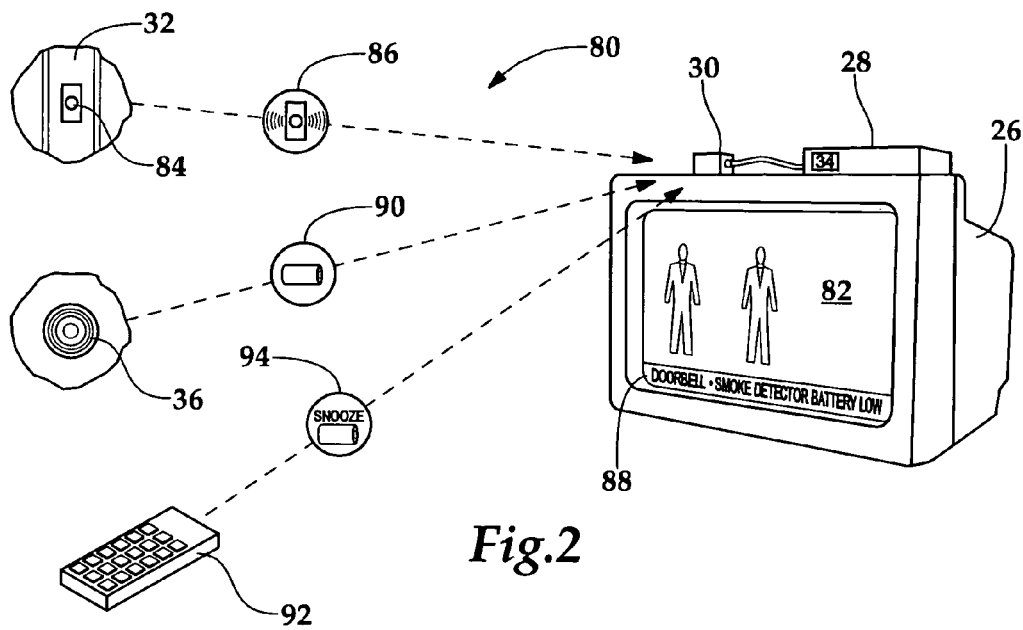
FIG. 2 is a schematic diagram of one embodiment of a system for providing home awareness.

FIG. 2 depicts one embodiment of a system 80 for providing home awareness. The television 26, which may be a CRT television, front projection system or flat panel system, for example, provides programming 82 by way of set top box 28 while the monitoring unit 30 receives broadcasted wireless signals from sensors associated with household amenities. As depicted, a doorbell 84 having a sensor is positioned at the front door 32. When the doorbell 84 is rung, the sensor associated with the doorbell broadcasts a wireless signal 86 that is received by the monitoring unit 30. The monitoring unit 30 superimposes the text message "DOORBELL" over programming 82 at the location indicated by reference numeral 88.

Similarly, the smoke alarm 36 broadcasts a wireless signal 90 upon detecting a low battery condition. In response to the wireless signal 90, the monitoring unit 30 generates the text message "SMOKE DETECTOR BATTERY LOW" and superimposes this text message onto the video signal feed that the monitoring unit 30 is relaying from the set top box 28 to the television 26. The text message "SMOKE DETECTOR BATTERY LOW" is displayed at the bottom of the program 82 as indicated by reference numeral 88.

As illustrated, a viewer watching the program 82 may utilize remote control 92 to affect or modify the behavior of the monitoring unit 30. The remote control 92 sends a wireless "snooze" signal 94 to the monitoring unit 30, which in turn, will suppress the "SMOKE DETECTOR BATTERY LOW" message for a period of time. Accordingly, the system and method presented herein uses a television to provide home awareness to television viewers by utilizing the reporting abilities of disparate sensors in conjunction with the communication facility of a connected home.

Figure 3:
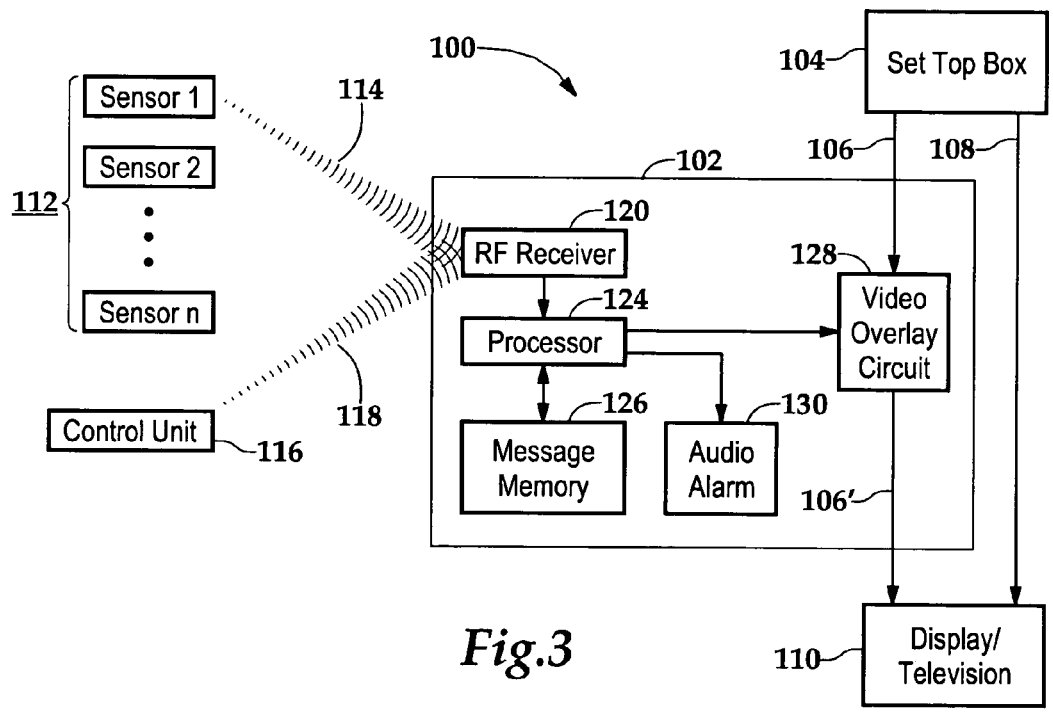
FIG. 3 is a functional block diagram of one embodiment of a system for providing home awareness.

FIG. 3 depicts one embodiment of a system 100 for providing home awareness. A monitoring unit 102 is coupled to a set top box 104 which provides a video signal 106. Additionally, the set top box 104 provides an audio signal 108. It should be appreciated that in another embodiment both the video signal 106 and the audio signal 108 may be supplied to the monitoring unit 102. As previously discussed, the monitoring unit is operable to overlay a text message onto the video signal 106. A video signal 106', which may include the overlaid text message, and the audio signal 108 are supplied to a display unit 110 which, in one embodiment, comprises a television. It should be appreciated, however, that the display unit 110 may be a computer monitor or other device that provides for the resolution and presentation of information. Moreover, it should be appreciated that in instances where the monitoring unit 102 does not receive a wireless signal, the video signal 106 is passed through the monitoring unit and is substantially identical to the video signal 106'.

Sensors 112, which are labeled sensor 1 through sensor n, are associated with household amenities. As illustrated, sensor 1 of the sensors 112 is transmitting a wireless signal 114 to the monitoring unit 102. The sensors 112 are wireless-enabled devices that provide wireless signals to the monitoring unit 102 by using any known or heretofore yet unknown wireless standard. In one embodiment, an Institute of Electrical and Electronics Engineers IEEE-based 802 standard such as 802.11 or 802.15 is utilized to transmit information from the sensors 112 to the monitoring unit 102.

The type of sensor utilized will depend on the particular household amenity and type of event occurrence being monitored and reported. For example, a simple closure switch in combination with a transmitter may be utilized to monitor the opening and closing of a refrigerator door. In a more complex application, the status or health of a HVAC system may be monitored by placing a thermometer having a transmitter at an air return inlet and another thermometer and transmitter combination at an air outlet. The monitoring unit 102 may then calculate the differential of the two reported temperatures to measure the efficiency of the HVAC system, measure the system health, and predict system failures. Other types of sensors that may be utilized include moisture detectors, micro switches, infrared motion detectors, mechanical sensors, electrical sensors, and optical sensors, for example. In one embodiment, each sensor may include a transmitter that is battery powered. In another embodiment, each sensor is embedded in the household amenity as an OEM offering.

A control unit 116 is transmitting a wireless signal 118 to the monitoring unit 102. The control unit may be utilized to program the monitoring unit 102 or alter the behavior of the monitoring unit 102. In one implementation, the control unit 116 is integrated with the monitoring unit 102. In another implementation, the control unit 116 is a television remote control, a cellular phone, Personal Digital Assistant (PDA) or other electronic device that is capable of wireless communications.

The wireless signals 114 and 118 are received by an RF receiver 120. In instances where one of the sensors 112 or the control unit 116 utilizes an infrared-based protocol, the monitoring unit is equipped with an infrared sensor. A processor 124 communicates with the RF receiver 120, message memory 126, a video overlay circuit 128, and an audio alarm 130. The processor 124 handles the processing of the wireless signal and, in particular, establishes the text message to be inserted by the video overlay circuit 128 based upon the content of the wireless signal and, in one embodiment, the use of the message memory 126.

The audio alarm may be utilized to notify a household member of a message in instances where the television is turned OFF. In another embodiment, the monitoring unit 102 may turn the television ON upon receiving a wireless signal. It should be appreciated that each of the components of the monitoring unit 102 may be any combination of hardware, software, and firmware. Further, the monitoring unit 102 may be integrated with the set top box 104, the display unit 110, or both. In particular, the monitoring unit 102 may be integrated with a cable box, a satellite box, a video cassette device (e.g., recorder and/or player), a DVD device, a television receiver, or a monitor, for example.

In one operational embodiment, the video overlay circuit 128 inserts the text message onto line 21 of the vertical blanking interval (VBI) of the video signal in a manner that is similar to closed caption signaling, which is defined by the Electronics Industry Alliance 608B (EIA-608B) standard. Further, the video overlay circuit 128 may utilize both caption channels (CC1 and CC2) and both text channels (T1 and T2) that are associated with field 1 of the EIA-608B standard. In another embodiment, the video overlay circuit 128 may utilize the additional caption channels (CC3 and CC4), additional text channels (T1 and T2), and extended data services (XDS) that are associated with field 2 of the EIA-608B standard.

The video overlay circuit 128 may also employ the Serial Digital Interface (SD-SDI) 601 standard or the High Definition (HD) SDI standard defined by the Advanced Television Systems Committee (ATSC). The SD-SDI 601 standard uses line 21 of the VBI and adds the functionality that the video signal may be digital. On the other hand, the HD-SDI standard allocates a data rate of 9600 bps for closed captioning use. This high data rate allows the text message to be embellished with multiple colors and a customizable caption appearance that may include characters.

The text message or text messages superimposed by the video overlay circuit 128 may be displayed in a "roll up," "paint on," or "pop up" mode. The roll up mode facilitates comprehension of the message during live events. Text messages are displayed or wiped on the television from the left to the right and then rolled up as the next line appears underneath. In the paint on mode, a single line of text is wiped onto the screen where it remains briefly before being wiped off. In the pop up mode, a complete sentence or statement is "popped" onto the television screen before being removed after a predetermined period of time.

In certain implementations, the monitoring unit 102 may perform additional functions. By way of example, the monitoring unit 102 may be able to request the current status of a sensor or activate or de-active an actuator device that is associated with the sensor. In this embodiment, both the monitoring unit 102 and a sensor are equipped with transceivers that provide for both sending and receiving signals. Additionally, the sensor would be equipped with the required electronics and mechanics to achieve the desired actuation.

It should be appreciated that the monitoring unit 102 is not limited to systems for providing home awareness. The monitoring unit 102 may be utilized in applications to provide environmental awareness to individuals. By way of another example, the monitoring unit 102 may be utilized in transient environments such as hotels, inns, public houses, and the like. Likewise, the monitoring unit 102 may be utilized in non residential and commercial settings such as airports, office buildings, and malls, for example. With respect to office buildings, for example, televisions or other types of displays may be positioned in heavy traffic zones, such as hallways near elevator banks or restrooms, to provide environmental awareness relative to building maintenance or, more importantly, emergency instructions detailing available exit or escape routes. In this office building implementation, the monitoring unit may be connected to a television and in response to receiving a wireless signal regarding an alarm event occurrence, the monitoring unit may superimpose onto the television a text message detailing an escape route or other vital emergency instructions.

Figure 4:
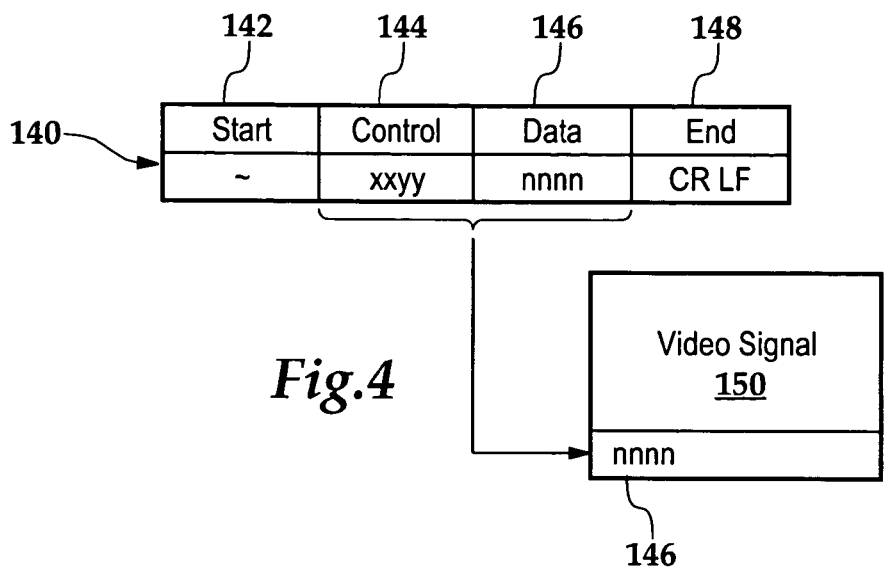
FIG. 4 is a functional block diagram of one embodiment of a wireless signal being processed by a monitoring unit of the system for providing home awareness.

FIG. 4 depicts one embodiment of a wireless signal 140 being processed by a monitoring unit of the system for providing home awareness. In one embodiment, the wireless signal 140 includes a start signal portion 142, a control signal portion 144, a data signal portion 146, and an end signal portion 148. The start signal portion 142 indicates that a valid wireless transmission is to follow. Additionally, the start signal portion 142 may include a unique identification of the sensor that provides the monitoring unit with an indication that the wireless signal to follow is authentic. The control signal portion 144 may be a four digit number that is used to position the text on the screen. In one implementation, the first two digits may specify the row with the 01 being the top row on the screen and the maximum row value being 12. The last two digits specify the start column wherein the value 01 specifies the left side of the screen and 28 is the maximum column value. In this embodiment, a special value of 9999, for example, may be used to turn off the display and erase the text data.

The data signal portion 146 contains the text message to be superimposed onto the video signal. In one embodiment, the data signal portion 146 may be a variable length field that utilizes the values depicted in the following character code table (wherein the rows are indicative of the upper nibble and the columns are indicative of the lower nibble) to relay a text message.

TABLE I

Characters Displayed on the Screen

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 1 | ® | ° | ½ | ¿ | ™ | ¢ | £ | ♪ | à | i | è | â | ê | î | ô | û |
| 2 | = | ! | " | # | $ | % | & | ' | ( | ) | á | + | , | - | . | / |
| 3 | 0 | 1 | 2 | 3 | 4 | 5 | 6 | 7 | 8 | 9 | : | ; | < | 0 | > | ? |
| 4 | @ | A | B | C | D | E | F | G | H | I | J | K | L | M | N | O |
| 5 | P | Q | R | S | T | U | V | W | X | Y | Z | [ | é | ] | í | ó |
| 6 |   | a | b | c | d | e | f | g | h | i | j | k | l | m | n | o |
| 7 | p | q | r | s | t | u | v | w | x | y | z | ç | ± | Ñ | ñ | ■ |
| 8 | ` | , | © | SM |   | " | " | β | ¥ | ¤ | Θ | Ç |   | · | << | >> |
| A |   | - | - | — | ! | [ | ] | T | \| | [ | ] | ⊥ | \| | ⊢ | ⌐ | + |
| B | 0 | { | } | \ | ^ | _ | \| | ~ |   |   |   |   |   |   |   |   |

Although up to 336 characters may be displayed on the 28 columns and 12 rows of a standard television screen at any time, only a few characters will typically be depicted at one time on the bottom of the screen. The end signal portion 148 is utilized to terminate the wireless signal.

As depicted, once the wireless signal 140 is received by the monitoring unit, the control signal portion 144 is accessed to determine the location in the video signal 150 to position the text message contained in the data signal portion 146.

Figure 5:
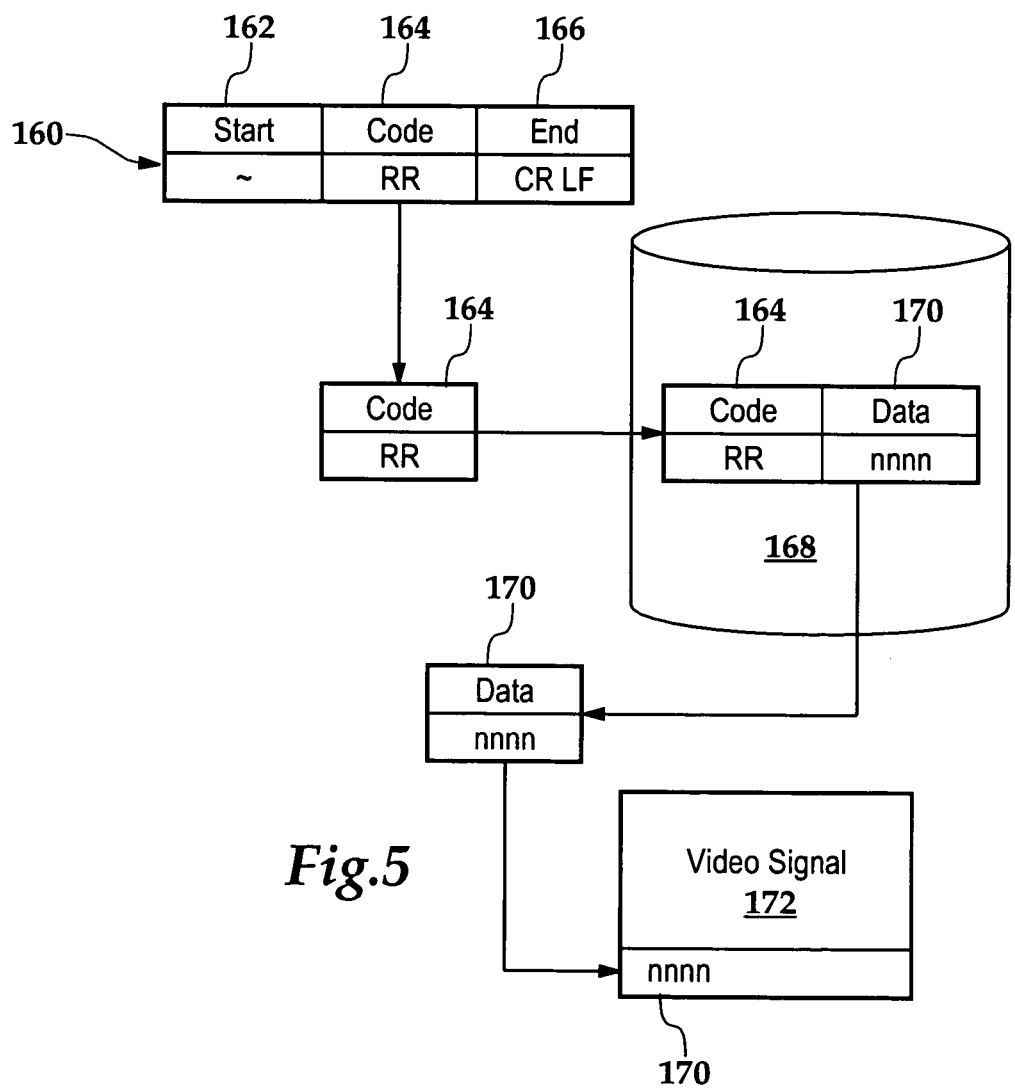
FIG. 5 is a functional block diagram of another embodiment of a wireless signal being processed by a monitoring unit of the system for providing home awareness.

FIG. 5 depicts another embodiment of a wireless signal 160 being processed by a monitoring unit of the system for providing home awareness. The wireless signal 160 includes a start signal portion 162, a code signal portion 164, and an end signal portion 166. The start signal portion 162 identifies the beginning of a valid wireless signal and the end signal portion 166 identifies the termination of the valid wireless signal. The code signal portion 164 provides a code that is utilized to access the text message to be displayed from a database 168.

As illustrated, the code signal portion 164 is employed during a table search of database 168 to access data 170, which contains the text message and insertion instructions. In particular, the database 168 may form a portion of the message memory 126 of FIG. 3. Once the data 170 is accessed, the text message is superimposed into the appropriate location of the video signal 172. In many applications, the sensors will only have the ability to send short general text messages or numeric codes. Given the limited processing and memory capabilities of the sensors, the code signal embodiment of FIG. 5 may be preferable to the embedded data embodiment of FIG. 4.

Figure 6:
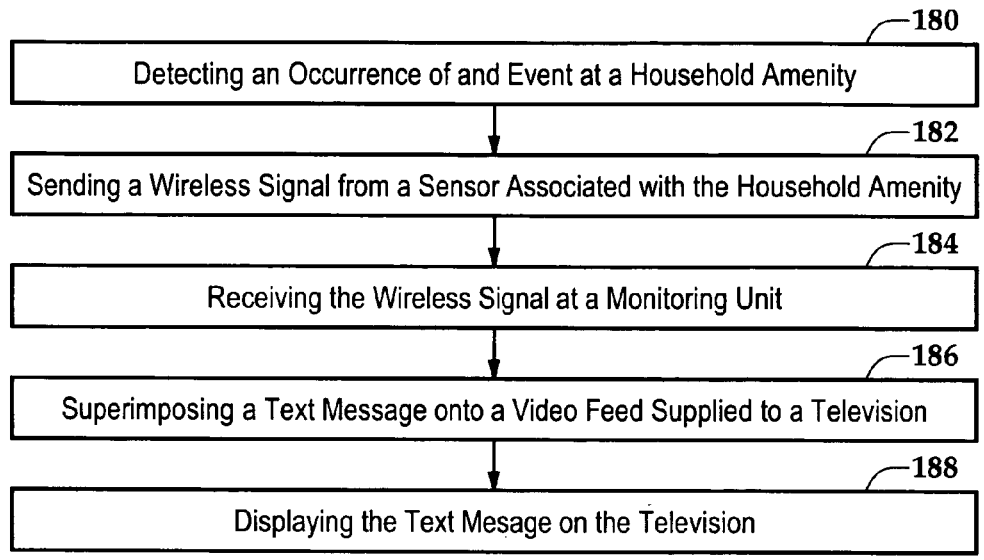
FIG. 6 is a flow chart of one embodiment of a method for providing home awareness.

FIG. 6 depicts one embodiment of a method for providing home awareness. At block 180, an occurrence of an event is detected at a household amenity. At block 182, a wireless signal is sent from a sensor associated with the household amenity. At block 184, the wireless signal is received at a monitoring unit. At block 186, a text message is superimposed onto a video feed supplied to a television. At block 188, the text message is displayed on the television. It should be understood that the methodology presented in FIG. 6 is applicable to providing environmental awareness in addition to home awareness.

Figure 7:
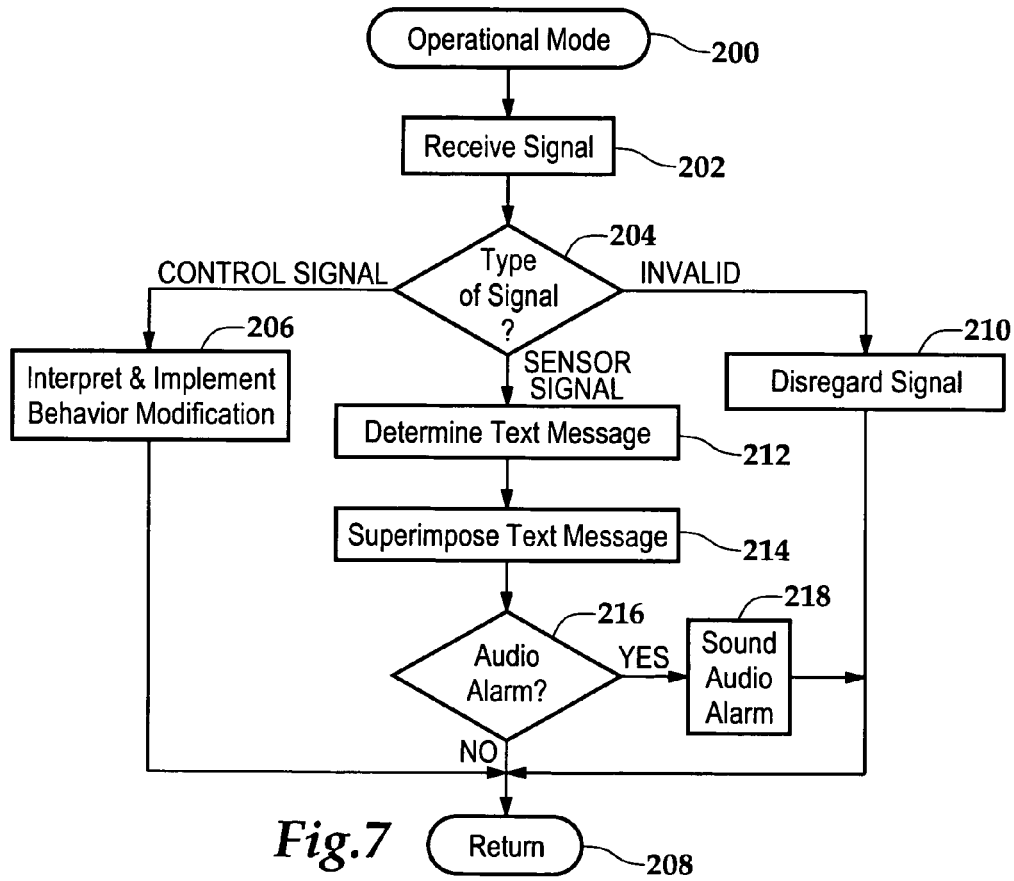
FIG. 7 is a flow chart of one embodiment of the operation of a monitoring unit of the system for providing home awareness.

FIG. 7 depicts one embodiment of the operation of a monitoring unit of the system for providing home awareness. The monitoring unit is in an operational mode at block 200. At block 202, the monitoring unit receives a wireless signal and the type of wireless signal is determined at decision block 204. If the wireless signal is a control signal, then at block 206 the signal is interpreted and the appropriate behavior modification is implemented. Following the implementation of the behavior modification, the process returns to block 200 by way of block 208.

Returning to decision block 204, if the wireless signal is an invalid signal, i.e., a signal not intended for the monitoring unit, then the signal is disregarded at block 210 and the process continues to block 208. As previously alluded to, a variety of techniques may be utilized to determine if a wireless signal is an authentic signal from a sensor associated with a household amenity. In one embodiment, a unique identification code is assigned to each sensor during the manufacture of the sensor. During the installation of the system, each identification code is entered into the monitoring unit. In another embodiment, the monitoring unit may be configured with the use of a computer.

Once again returning to decision block 204, if the signal is an authentic sensor signal then the text message is determined at block 212. The text message may be determined using the embedded data embodiment of FIG. 4 or the code signal embodiment of FIG. 5, for example. At block 214, the text message is superimposed onto the video signal. At decision block 216, if an alarm is to accompany the text message, then an audio alarm is sounded at block 218 and the methodology continues to block 208. The alarm may be sounded when the television is OFF to alert a household member that a message has been received. When the television is ON, the alarm may be sounded to emphasize a particularly important message. Otherwise, if no alarm is required, then the methodology progresses to block 208.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for providing home awareness, the system comprising:
   a sensor associated with a household amenity;
   a control signal portion generated at the sensor in response to an event occurrence associated with the household amenity;

a text message generated at the sensor in response to the event occurrence, the text message providing data about the event occurrence in form of values expressed as upper nibbles and lower nibbles;

a wireless signal generated at the sensor, the wireless signal including the control signal portion and the text message;

a database including a representation of a character code table for translating the values expressed as upper nibbles and lower nibbles into characters for display;

a monitoring unit having access to the database, responsive to receiving the wireless signal, for performing one of:

(i) passing an existing video feed through the monitoring unit, the existing video signal originating independently of the sensor and including content differing from the data about the event occurrence, and (ii) superimposing the characters for display into line 21 of a vertical blanking interval of the existing video signal at a position indicated by the control signal portion; and a display unit connected to the monitoring unit, the display unit for displaying the existing video signal and the existing video signal with the superimposed characters for display providing the data about the event occurrence.

2. The system as recited in claim 1, wherein the household amenity is selected from the group consisting of security alarm systems, garage doors, hot-water heaters, sump pumps, door bells, pet bowls, HVAC systems, and entry points.

3. The system as recited in claim 1, wherein the event occurrence is selected from the group consisting of power failures, water leaks, and security breaches.

4. The system as recited in claim 1, further comprising a satellite box that provides the existing video signal to the monitoring unit.

5. The system as recited in claim 1, wherein the monitoring unit is integrated with a device selected from the group consisting of cable boxes, satellite boxes, video cassette devices, DVD devices, television receivers, and monitors.

6. The system as recited in claim 1, wherein the display unit comprises a television.

7. The system as recited in claim 1, wherein the text message comprises data selected from the group consisting of alphanumeric characters, icons, and symbols.

8. A method for providing home awareness, the method comprising:

associating a sensor with a household amenity;

passing an existing video feed through the monitoring unit to a television, the existing video feed originating independently of the first and second sensors and including content differing from data about an event occurrence at the household amenity;

detecting an occurrence of the event at the household amenity;

generating a control signal at a sensor associated with the household amenity;

generating a text message at the sensor, the text message providing data about the event occurrence in form of values expressed as upper nibbles and lower nibbles;

sending a wireless signal from a sensor associated with the household amenity, the wireless signal including the control signal and the text message;

receiving the wireless signal at a monitoring unit;

accessing a database including a representation of a character code table for translating the values expressed as the upper nibbles and the lower nibbles into characters for display;

superimposing the characters for display into line 21 of a vertical blanking interval of the existing video signal at a position indicated by the control signal portion; and displaying the text message on the television at the position indicated by the control signal.

9. The method as recited in claim 8, further comprising verifying that the wireless signal originated from the sensor.

10. The method as recited in claim 8, wherein detecting the occurrence of the event further comprises detecting an event selected from the group consisting of power failures, water leaks, and security breaches.

11. A system for providing home awareness, the system comprising:

a first sensor associated with a first household amenity, the first sensor having a first unique identification number being associated therewith;

a second sensor associated with a second household amenity, the second sensor having a second unique identification number being associated therewith;

a wireless signal generated at the first sensor in response to an event occurrence associated with the first household amenity, the wireless signal including a code signal portion which corresponds to a text message which provides data about the event occurrence, the code signal portion being associated with the first unique identification number to identify the first sensor;

a monitoring unit, responsive to receiving the wireless signal, for performing tasks of:

(i) passing an existing video feed through the monitoring unit, the existing video signal originating independently of the sensor and including content differing from the data about the event occurrence, and (ii) identifying the text message stored at the monitoring unit based on the code signal portion of the wireless signal and superimposing the text message onto the existing video signal; and a display unit connected to the monitoring unit, the display unit for displaying the existing video signal and the existing video signal with the superimposed text message providing the data about the event occurrence.

12. The system as recited in claim 11, wherein the first household amenity is selected from the group consisting of security alarm systems, garage doors, front doors, hot-water heaters, sump pumps, door bells, pet bowls, HVAC systems, and entry points.

13. The system as recited in claim 11, wherein the event occurrence is selected from the group consisting of power failures, water leaks, and security breaches.

14. The system as recited in claim 11, further comprising a satellite box that provides the existing video signal to the monitoring unit.

15. The system as recited in claim 11, wherein the monitoring unit is integrated with a device selected from the group consisting of cable boxes, satellite boxes, video cassette devices, DVD devices, television receivers, and monitors.

16. The system as recited in claim 11, wherein the display unit comprises a television.

17. The system as recited in claim 11, wherein the text message is inserted into line 21 of a vertical blanking interval of the video signal.

18. The system as recited in claim 11, wherein the text message comprises data selected from the group consisting of alphanumeric characters, icons, and symbols.

19. A method for providing home awareness, the method comprising:
   associating a first sensor having a first unique identification number with a first household amenity;
   associating a second sensor having a second unique identification number with a second household amenity;
   programming a monitoring unit with the first and second unique identification numbers;
   associating respective code signals with the first and second unique identification numbers programmed into the monitoring unit, the code signals corresponding to text messages providing data about an event occurrence at one of the first and second sensors;
   passing an existing video feed through the monitoring unit to a television, the existing video feed originating independently of the first and second sensors and including content differing from data about the event occurrence;
   detecting an occurrence of an event at the first household amenity;
   generating a code signal at the first sensor associated with the first household amenity, the code signal being one of the respective code signals corresponding to a text message stored at the monitoring unit providing data about the event occurrence;
   sending a wireless signal from the first sensor associated with the household amenity, the wireless signal including the first identification number and the code signal;
   receiving the wireless signal at a monitoring unit;
   identifying the first sensor based on the first identification number stored at the monitoring unit;
   identifying the text message stored at the monitoring unit based on the code signal;
   superimposing the text message onto the existing video feed supplied to the television; and
   displaying the text message on the television.

20. The method as recited in claim 19, further comprising verifying that the wireless signal originated from the first sensor.

21. The method as recited in claim 19, wherein detecting the occurrence of the event further comprises detecting an event selected from the group consisting of power failures, water leaks, and security breaches.

22. The method as recited in claim 19, wherein superimposing the text message further comprises inserting the text message into line 21 of the vertical blanking interval of the video signal.

* * * * *